United States Patent
Zhang et al.

(10) Patent No.: US 10,652,389 B2
(45) Date of Patent: May 12, 2020

(54) CALL HOLD METHOD AND MOBILE TERMINAL

(71) Applicant: Huawei Technologies Co., Ltd., Shenzhen (CN)

(72) Inventors: Zhenzhong Zhang, Shenzhen (CN); Yuwei Fan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/474,796

(22) PCT Filed: Dec. 30, 2016

(86) PCT No.: PCT/CN2016/113983
§ 371 (c)(1),
(2) Date: Jun. 28, 2019

(87) PCT Pub. No.: WO2018/120235
PCT Pub. Date: Jul. 5, 2018

(65) Prior Publication Data
US 2019/0349474 A1 Nov. 14, 2019

(51) Int. Cl.
*H04M 3/428* (2006.01)
(52) U.S. Cl.
CPC .................... *H04M 3/428* (2013.01)
(58) Field of Classification Search
CPC ....................................................... H04M 3/428
USPC ....................................................... 455/414.1
See application file for complete search history.

(56) References Cited

U.S. PATENT DOCUMENTS

| 6,324,281 | B1 | 11/2001 | Liinamaa et al. |
| 2008/0310312 | A1 | 12/2008 | Acharya et al. |
| 2014/0010118 | A1 | 1/2014 | Bakker |
| 2014/0233717 | A1 | 8/2014 | Pujic et al. |

FOREIGN PATENT DOCUMENTS

| CA | 2738191 A1 | 10/2011 |
| CN | 1243642 A | 2/2000 |
| CN | 1968318 A | 5/2007 |
| CN | 101217702 A | 7/2008 |

(Continued)

OTHER PUBLICATIONS

RFC 5407 Hasebe et al. Dec. 2008 (Year: 2008).*

(Continued)

*Primary Examiner* — William Nealon
(74) *Attorney, Agent, or Firm* — Conley Rose, P.C.

(57) ABSTRACT

A call hold method includes receiving a call hold request sent from a peer end; returning a 200 OK message to the peer end; receiving a user instruction for sending a call hold request to the peer end; determining whether an acknowledgement message based on the call hold request of the peer end is received from the peer end; and processing, based on an acknowledgement message determining result, the user instruction for sending a call hold request to the peer end. Accordingly, when a user has a call hold request, a mobile terminal first determines whether a procedure based on the call hold request of the peer end is completed at the peer end, and then determines to process the call hold request of the user, thereby preventing a call drop.

20 Claims, 18 Drawing Sheets

(56) References Cited

FOREIGN PATENT DOCUMENTS

| CN | 101325605 A | 12/2008 |
|---|---|---|
| CN | 105207764 A | 12/2015 |

OTHER PUBLICATIONS

RFC 5359 Johnston et al. Oct. 2008 (Year: 2008).*
RFC 7088 Worley, D. Feb. 2014 (Year: 2014).*
Rosenberg, J., et al., "An Offer/Answer Model with the Session Description Protocol (SDP)," RFC 3264, Jun. 2002, 25 pages.
Johnston, A., Ed., et al., "Session Initiation Protocol Service Examples," RFC 5359, Oct. 2008, 170 pages.
Hasebe, M., et al., "Example Call Flows of Race Conditions in the Session Initiation Protocol (SIP)," RFC 5407, Dec. 2008, 60 pages.
Machine Translation and Abstract of Chinese Publication No. CN1968318, May 23, 2007, 23 pages.
Foreign Communication From a Counterpart Application, PCT Application No. PCT/CN2016/113983, English Translation of International Search Report dated Sep. 15, 2017, 2 pages.
Foreign Communication From a Counterpart Application, PCT Application No. PCT/CN2016/113983, English Translation of Written Opinion dated Sep. 15, 2017, 3 pages.
Machine Translation and Abstract of Chinese Publication No. CN101217702, Jul. 9, 2008, 12 pages.
Machine Translation and Abstract of Chinese Publication No. CN105207764, Dec. 30, 2015, 31 pages.
Foreign Communication From a Counterpart Application, Chinese Application No. 201680091962.X, Chinese Office Action dated Dec. 19, 2019, 6 pages.

* cited by examiner

CALL HOLD METHOD AND MOBILE TERMINAL

CROSS-REFERENCE TO RELATED APPLICATIONS

This application is a U.S. National Stage of International Patent Application No. PCT/CN2016/113983 filed on Dec. 30, 2016, which is hereby incorporated by reference in its entirety.

TECHNICAL FIELD

The present invention relates to the communications field, and in particular, to a call hold method and a mobile terminal.

BACKGROUND

VoLTE/VoWiFi is an IP-based voice transmission technology in which all services are carried on a 4G/WiFi network, and can implement transmission of data and voice services on a same network. SIP (Session Initiation Protocol, Session Initiation Protocol) signaling is used for voice communication. A standard VoLTE or VoWiFi call procedure is shown in FIG. 1. A mobile terminal user Alice intends to call a mobile terminal user Bob. A mobile terminal of Alice sends an INVITE message to a server. The server forwards INVITE to a mobile terminal of Bob. After Bob answers the call, the mobile terminal of Bob returns a 200 OK message to the server. The server returns the 200 OK message to the mobile terminal of Alice. The mobile terminal of Alice returns an ACK (Acknowledgement, acknowledgement character) to the server. The server returns the ACK to the mobile terminal of Bob. In this way, the call is set up between Alice and Bob. When Alice intends to request to hold the call, a procedure is shown in FIG. 2. The mobile terminal of Alice sends an INVITE (hold) message to the server. The server forwards INVITE (hold) to the mobile terminal of Bob. The mobile terminal of Bob returns a 200 OK message to the server. The server returns the 200 OK message to the mobile terminal of Alice. The mobile terminal of Alice returns an ACK to the server. The server returns the ACK to the mobile terminal of Bob. In this way, a call hold operation is completed between Alice and Bob.

SUMMARY

Embodiments of the present invention describe a call hold method and a mobile terminal, to effectively monitor a current status of a mobile phone, avoid a signaling collision caused by operation behavior of a user, finally complete an expected operation of the user, and avoid affecting user experience and dropping a call.

According to one aspect, an embodiment of the present invention provides a call hold method. The method includes: receiving a call hold request sent from a peer end; returning a 200 OK message to the peer end; receiving a user instruction for sending a call hold request to the peer end; determining whether an acknowledgement message based on the call hold request of the peer end is received from the peer end; and processing, based on an acknowledgement message determining result, the user instruction for sending a call hold request to the peer end. In the method, when a user has a call hold request, a mobile terminal first determines whether a procedure based on the call hold request of the peer end is completed at the peer end, and then determines to process the call hold request of the user, thereby preventing a call drop and improving user experience.

In a possible case, the processing, based on an acknowledgement message determining result, the user instruction for sending a call hold request to the peer end includes: sending a call hold request to the peer end after it is determined that an acknowledgement message based on the call hold request of the peer end is received from the peer end.

In a possible case, the processing, based on an acknowledgement message determining result, the user instruction for sending a call hold request to the peer end includes: after it is determined that an acknowledgement message based on the call hold request of the peer end is not received from the peer end, placing, in a to-be-processed queue, the call hold request to be sent to the peer end, and starting timing; and if an acknowledgement message based on the call hold request of the peer end is received from the peer end within a preset time segment, stopping timing, and sending the call hold request that is to be sent to the peer end and that is in the to-be-processed queue; or if an acknowledgement message based on the call hold request of the peer end is not received from the peer end within a preset time, when a timing time segment is greater than or equal to the preset time segment, sending the call hold request that is to be sent to the peer end and that is in the to-be-processed queue.

When the user has a call hold request, the mobile terminal first determines whether the procedure based on the call hold request of the peer end is completed at the peer end. If the procedure is completed, that is, an acknowledgement message based on the call hold request procedure of the peer end is received, it indicates that no signaling collision occurs, and sending a call hold request to the peer end at this time does not cause a call drop. In this case, the mobile terminal may send the call hold request to the peer end. If an acknowledgement message based on the call hold request procedure of the peer end is not received, the mobile terminal suspends sending the call hold request to the peer end, thereby preventing a call drop and improving user experience.

In a possible case, the method further includes: obtaining a status of an access control module, and determining, based on the status of the access control module, whether to perform an operation of determining whether an acknowledgement message based on the call hold request of the peer end is received from the peer end.

In a possible case, the obtaining a status of an access control module, and determining, based on the status of the access control module, whether to perform the operation of determining whether an acknowledgement message based on the call hold request of the peer end is received from the peer end includes: if the status of the access control module is an end state, determining whether an acknowledgement message based on the call hold request of the peer end is received from the peer end; and if the status of the access control module is an initial state or a start state, skipping determining whether an acknowledgement message based on the call hold request of the peer end is received from the peer end.

In a possible design, if the obtained status of the access control module is an initial state or a start state, it is also determined whether an acknowledgement message based on the call hold request of the peer end is received from the peer end.

When the user has a call hold request, the mobile terminal first determines the status of the access control module, and determines, based on the status of the access control module, whether to perform the operation of determining whether an acknowledgement message based on the call hold request of the peer end is received from the peer end, thereby expanding a scope of avoiding a call hold failure, and improving user experience.

According to another aspect, an embodiment of the present invention provides a mobile terminal. The mobile terminal includes: a first receiving module, configured to receive a call hold request sent from a peer end; a sending module, configured to return a 200 OK message to the peer end; a second receiving module, configured to receive a user instruction for sending a call hold request to the peer end; a determining module, configured to determine whether an acknowledgement message based on the call hold request of the peer end is received from the peer end; and a processing module, configured to process, based on an acknowledgement message determining result, the user instruction for sending a call hold request to the peer end.

According to the foregoing mobile terminal, when a user has a call hold request, the mobile terminal first determines whether a procedure based on the call hold request of the peer end is completed at the peer end, and then determines to process the call hold request of the user, thereby preventing a call drop and improving user experience.

In a possible design, the processing module includes a sending submodule, and that the processing module processes, based on the acknowledgement message determining result, the user instruction for sending a call hold request to the peer end includes: the sending submodule sends a call hold request to the peer end after it is determined that an acknowledgement message based on the call hold request of the peer end is received from the peer end.

In a possible design, the processing module further includes a timing module, and that the processing module processes, based on the acknowledgement message determining result, the user instruction for sending a call hold request to the peer end includes: after it is determined that an acknowledgement message based on the call hold request of the peer end is not received from the peer end, the processing module places, in a to-be-processed queue, the call hold request to be sent to the peer end, and starts the timing module for timing; and if an acknowledgement message based on the call hold request of the peer end is received from the peer end within a preset time segment, the timing module stops timing, and the processing module sends the call hold request that is to be sent to the peer end and that is in the to-be-processed queue; or if an acknowledgement message based on the call hold request of the peer end is not received from the peer end within a preset time, when a timing time segment of the timing module is greater than or equal to the preset time segment, the processing module sends the call hold request that is to be sent to the peer end and that is in the to-be-processed queue.

According to the foregoing mobile terminal, when the user has a call hold request, the mobile terminal first determines whether the procedure based on the call hold request of the peer end is completed at the peer end. If the procedure is completed, that is, an acknowledgement message based on the call hold request procedure of the peer end is received, it indicates that no signaling collision occurs, and sending a call hold request to the peer end at this time does not cause a call drop. In this case, the mobile terminal may send the call hold request to the peer end. If an acknowledgement message based on the call hold request procedure of the peer end is not received, the mobile terminal suspends sending the call hold request to the peer end, thereby preventing a call drop and improving user experience.

In a possible design, the mobile terminal further includes a second processing module. The second processing module is configured to obtain a status of an access control module and determine, based on the status of the access control module, whether to perform the operation of determining whether an acknowledgement message based on the call hold request of the peer end is received from the peer end.

In a possible design, that the second processing module obtains a status of an access control module and determines, based on the status of the access control module, whether to perform the operation of determining whether an acknowledgement message based on the call hold request of the peer end is received from the peer end includes: if the status of the access control module that is obtained by the second processing module is an end state, the determining module determines whether an acknowledgement message based on the call hold request of the peer end is received from the peer end; and if the status of the access control module that is obtained by the second processing module is an initial state or a start state, the determining module skips determining whether an acknowledgement message based on the call hold request of the peer end is received from the peer end.

In a possible design, if the status of the access control module that is obtained by the second processor is an initial state or a start state, the determining module also determines whether an acknowledgement message based on the call hold request of the peer end is received from the peer end.

According to the foregoing mobile terminal, when the user has a call hold request, the mobile terminal first determines the status of the access control module, and determines, based on the status of the access control module, whether to perform the operation of determining whether an acknowledgement message based on the call hold request of the peer end is received from the peer end, thereby expanding a scope of avoiding a call hold failure, and improving user experience.

According to another aspect, an embodiment of the present invention provides a mobile terminal. The mobile terminal includes: a receiver, configured to receive a call hold request sent from a peer end; a sender, configured to return a 200 OK message to the peer end; a second receiver, configured to receive a user instruction for sending a call hold request to the peer end; and a processor, configured to determine whether an acknowledgement message based on the call hold request of the peer end is received from the peer end, and process, based on an acknowledgement message determining result, the user instruction for sending a call hold request to the peer end.

According to the foregoing mobile terminal, when a user has a call hold request, the mobile terminal first determines whether a procedure based on the call hold request of the peer end is completed at the peer end, and then determines to process the call hold request of the user, thereby preventing a call drop and improving user experience.

In a possible design, the processor includes a second sender, and that the processor processes, based on the acknowledgement message determining result, the user instruction for sending a call hold request to the peer end includes: the second sender sends a call hold request to the peer end after it is determined that an acknowledgement message based on the call hold request of the peer end is received from the peer end.

In a possible design, the processor further includes a timer, and that the processor processes, based on the acknowledgement message determining result, the user instruction for sending a call hold request to the peer end includes: after determining that an acknowledgement message based on the call hold request of the peer end is not received from the peer end, the processor places, in a to-be-processed queue, the call hold request to be sent to the peer end, and starts the timer for timing; and if an acknowledgement message based on the call hold request of the peer end is received from the peer end within a preset time segment, the timer stops timing, and the processor sends the call hold request that is to be sent to the peer end and that is in the to-be-processed queue; or if an acknowledgement message based on the call hold request of the peer end is not received from the peer end within a preset time, when a timing time segment of the timer is greater than or equal to the preset time segment, the processor sends the call hold request that is to be sent to the peer end and that is in the to-be-processed queue.

According to the foregoing mobile terminal, when the user has a call hold request, the mobile terminal first determines whether the procedure based on the call hold request of the peer end is completed at the peer end. If the procedure is completed, that is, an acknowledgement message based on the call hold request procedure of the peer end is received, it indicates that no signaling collision occurs, and sending a call hold request to the peer end at this time does not cause a call drop. In this case, the mobile terminal may send the call hold request to the peer end. If an acknowledgement message based on the call hold request procedure of the peer end is not received, the mobile terminal suspends sending the call hold request to the peer end, thereby preventing a call drop and improving user experience.

In a possible design, the mobile terminal further includes a second processor, and the second processor is configured to obtain a status of an access control module and determine, based on the status of the access control module, whether to perform the operation of determining whether an acknowledgement message based on the call hold request of the peer end is received from the peer end.

In a possible design, that the second processor obtains a status of an access control module and determines, based on the status of the access control module, whether to perform the operation of determining whether an acknowledgement message based on the call hold request of the peer end is received from the peer end includes: if the status of the access control module that is obtained by the second processor is an end state, the processor determines whether an acknowledgement message based on the call hold request of the peer end is received from the peer end; and if the status of the access control module that is obtained by the second processor is an initial state or a start state, the determining module determines whether an acknowledgement message based on the call hold request of the peer end is received from the peer end.

In a possible design, if the status of the access control module that is obtained by the second processor is an initial state or a start state, the determining module also determines whether an acknowledgement message based on the call hold request of the peer end is received from the peer end.

According to the foregoing mobile terminal, when the user has a call hold request, the mobile terminal first determines the status of the access control module, and determines, based on the status of the access control module, whether to perform the operation of determining whether an acknowledgement message based on the call hold request of the peer end is received from the peer end, thereby expanding a scope of avoiding a call hold failure, and improving user experience.

It can be learned from the foregoing solutions that the method and the mobile terminal provided by the embodiments of the present invention improve user experience.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
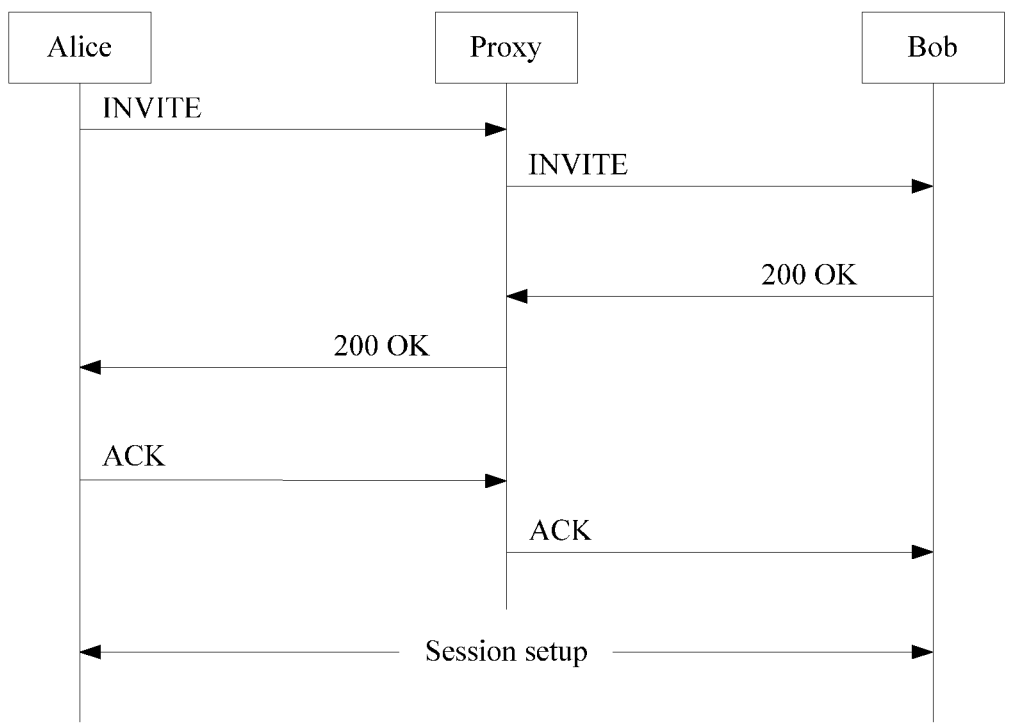
FIG. 1 is a flowchart of initiating a call by a VoLTE mobile terminal.
Figure 2:
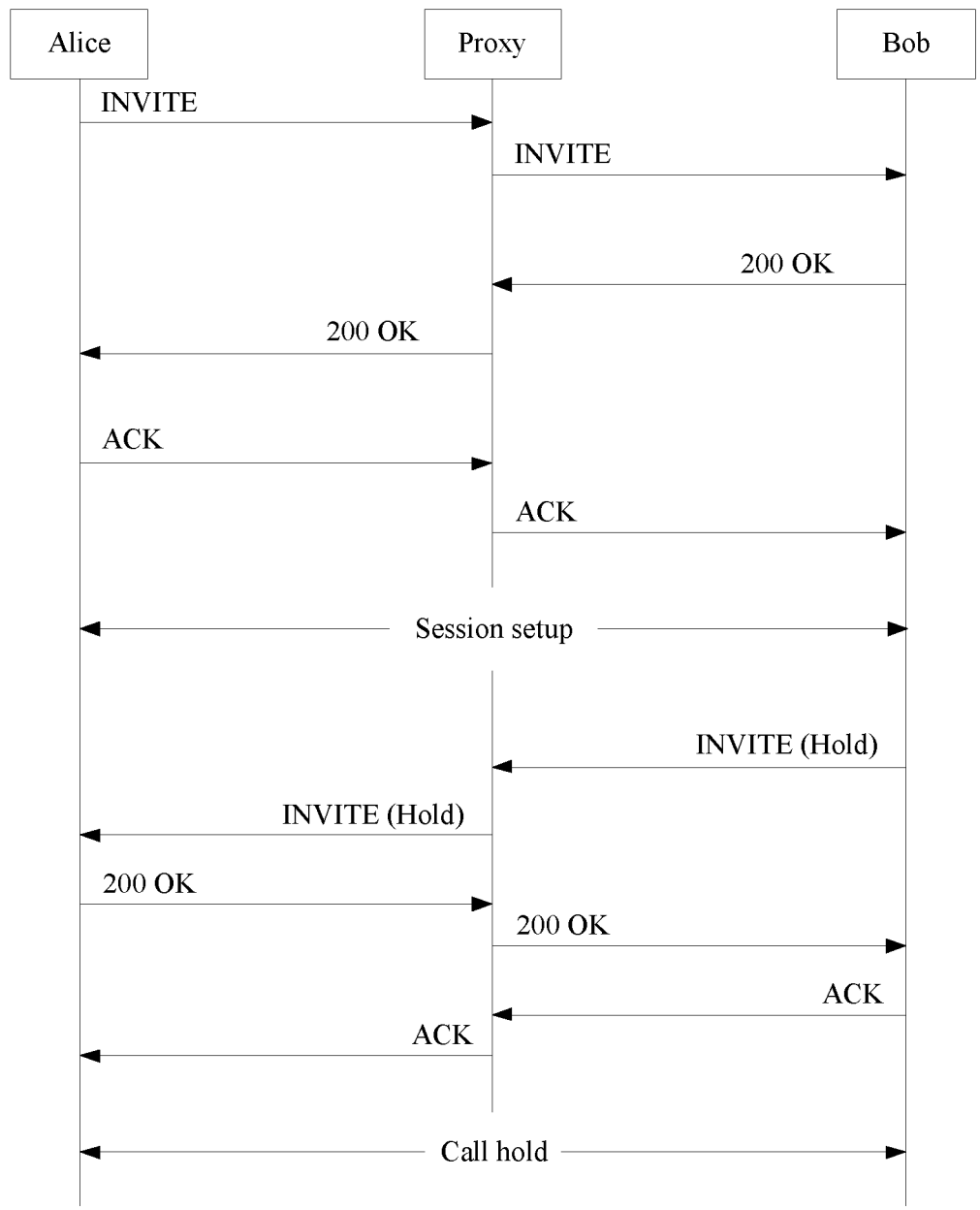
FIG. 2 is a flowchart of initiating call hold by a mobile terminal.
Figure 3:
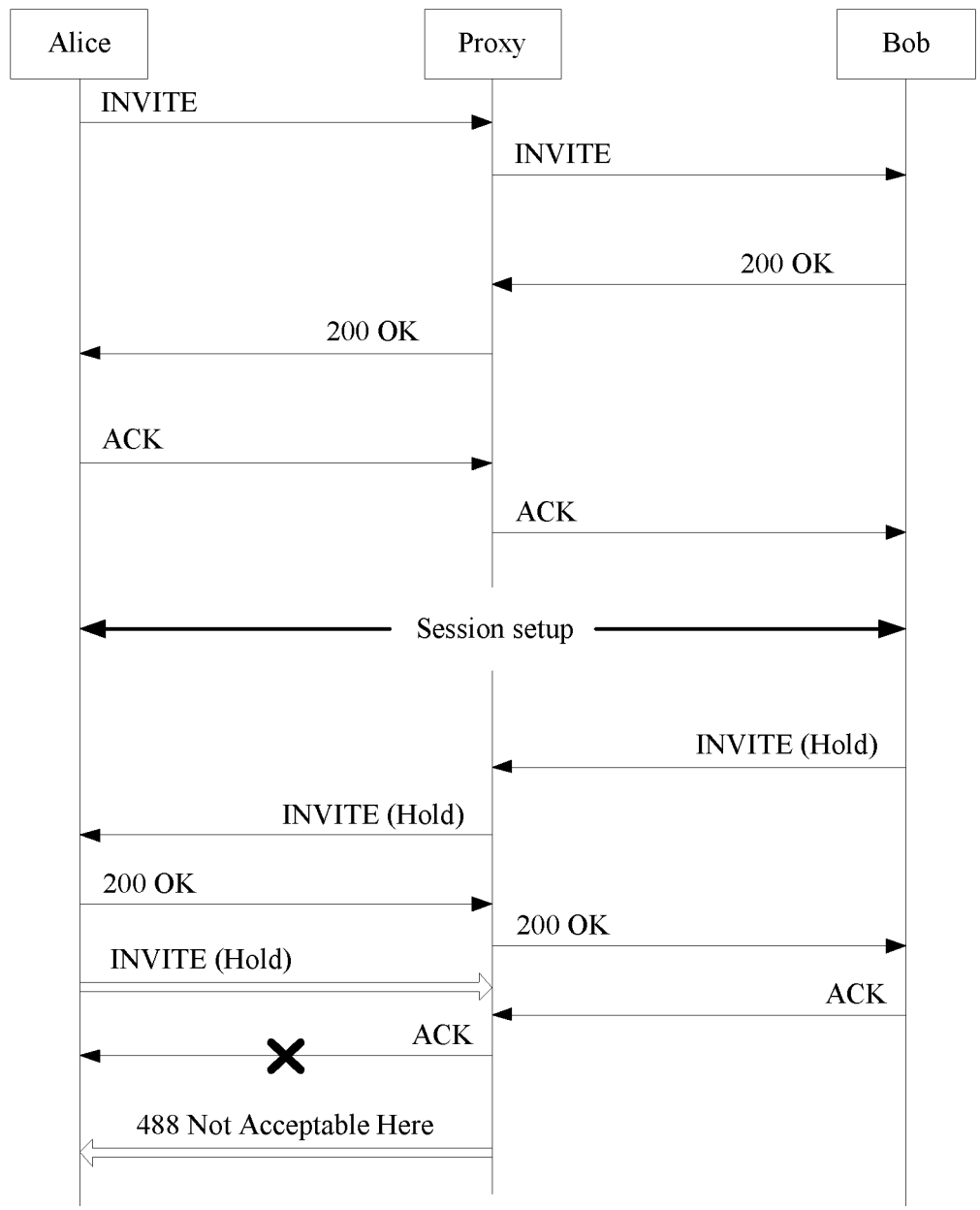
FIG. 3 is a flowchart of causing a signaling collision during initiating call hold by a mobile terminal.

As shown in FIG. 3, Bob has a call hold requirement during a call between Alice and Bob. After Bob sends a call hold instruction to a mobile terminal of Bob, the mobile terminal of Bob sends, to a server, an INVITE (Hold) message for requesting call hold. After receiving the request, the server sends, to a mobile terminal of Alice, an INVITE (Hold) message for call hold. The mobile terminal of Alice returns a 200 OK message. Before the mobile terminal of Alice receives an acknowledgement message ACK returned from the mobile terminal of Bob, Alice also has a call hold requirement. Alice sends a call hold instruction to the mobile terminal of Alice. The mobile terminal of Alice sends, to the server, an INVITE (Hold) message for call hold. Because the server is still waiting for the acknowledgement message sent by the mobile terminal of Bob, the server returns an error code of rejection, for example, 488 Not Acceptable Here, in response to the INVITE (Hold) message sent by the mobile terminal of Alice. Even if the server receives the acknowledgement message sent by the mobile terminal of Bob, the server does not return an acknowledgement message ACK to the mobile terminal of Alice. The terminal of Alice does not receive the acknowledgement message ACK, and therefore continuously resends the 200 OK message. The call drops after more than 16 RTTs (Round-Trip Time, round-trip time) elapse, where it is usually estimated that one RTT is 2000 ms. As a result, user experience is very poor.

To resolve the foregoing problem, the embodiments of the present invention provide a call hold method and a mobile terminal, to prevent a call drop during a call hold process.

Figure 4:
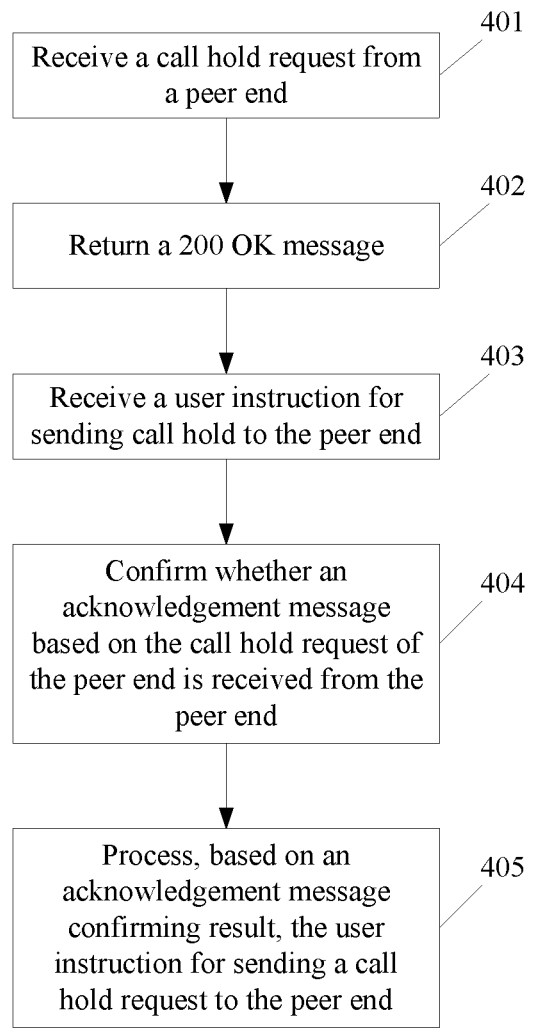
FIG. 4 is a method flowchart according to an embodiment of the present invention.

FIG. 4 shows a call hold method according to an embodiment of the present invention.

401: Receive a call hold request from a peer end.

During a call of a user of a mobile terminal, the peer end sends a call hold request. The mobile terminal receives the call hold request from the peer end.

402: Return a 200 OK message.

The mobile terminal returns the 200 OK message after receiving the call hold request.

403: Receive a user instruction for sending call hold to the peer end.

The mobile terminal user has a call hold requirement, and sends a call hold instruction to the mobile terminal. Usually, the call hold instruction may be sent by the user by using a virtual or real key of the mobile terminal, or may be sent by the user through voice.

404: Determine whether an acknowledgement message ACK based on the call hold request of the peer end is received from the peer end.

After receiving the call hold requirement instruction sent by the user, the mobile terminal determines whether an acknowledgement message ACK based on the call hold request of the peer end is received from the peer end.

405: Process, based on an acknowledgement message determining result, the user instruction for sending a call hold request to the peer end.

Specifically, if the mobile terminal determines that an acknowledgement message ACK based on the call hold request of the peer end is received from the peer end, it indicates that a procedure based on the call hold request of the peer end is completed. If a call hold request is sent to the peer end at this time, no signaling collision occurs. Therefore, sending a call hold request to the peer end does not cause a call drop, and the mobile terminal sends the call hold request to the peer end. If the mobile terminal determines that an acknowledgement message ACK based on the call hold request of the peer end is not received from the peer end, it indicates that the procedure based on the call hold request of the peer end is not completed or an error occurs. If a call hold request is sent to the peer end at this time, a signaling collision occurs. Therefore, sending a call hold request to the peer end causes a call drop, and the mobile terminal suspends sending the call hold request to the peer end.

According to the call hold method provided in this embodiment of the present invention, when the user has a call hold request, the mobile terminal first determines whether the procedure based on the call hold request of the peer end is completed at the peer end, and then determines to process the call hold request of the user, thereby preventing a call drop and improving user experience.

Figure 5:
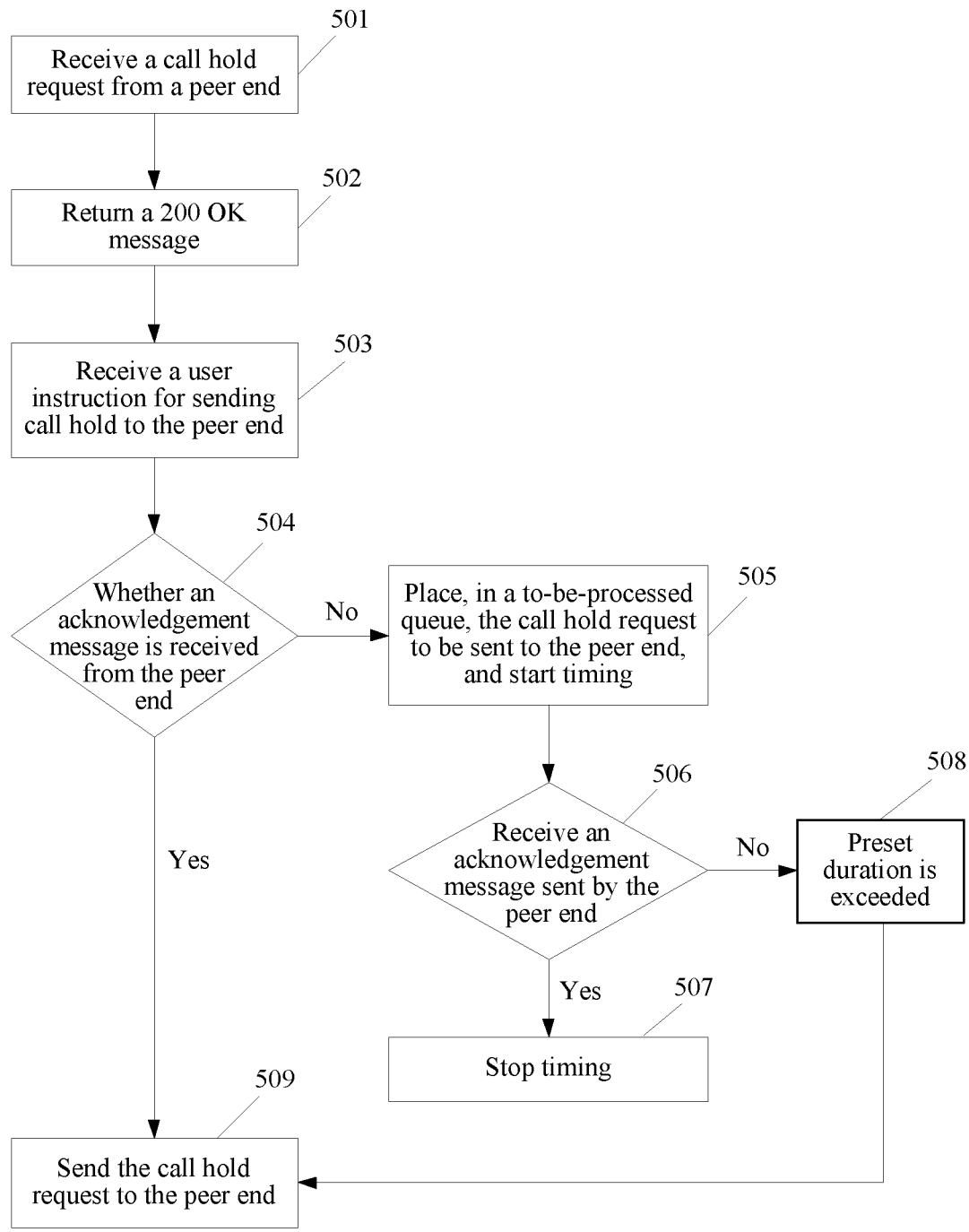
FIG. 5 is another method flowchart according to an embodiment of the present invention.

FIG. 5 shows a call hold method according to an embodiment of the present invention. Steps 501 to 504 are similar to steps 401 to 404 in the foregoing embodiment, and details are not described herein again.

505: After it is determined that an acknowledgement message based on the call hold request of the peer end is not received from the peer end, place, in a to-be-processed queue, the call hold request to be sent to the peer end, and start timing.

If the mobile terminal determines that an acknowledgement message that is based on the call hold request of the peer end and that is sent by the peer end is not received, the mobile terminal determines that a procedure based on the call hold request sent from the peer end is not completed, places, in a to-be-processed queue, the call hold request to be sent to the peer end, and starts timing.

506: Receive an acknowledgement message sent by the peer end.

During the timing, if the acknowledgement message sent by the peer end is received, step 507 is performed; or if the acknowledgement message sent by the peer end is not received, step 508 is performed.

507: Stop timing.

508: Preset duration is exceeded.

Timing may be counting down or comparing a timing time segment and a preset time segment. Exceeding preset duration may be that countdown time expires or that the timing time segment is greater than or equal to the preset time segment. Time consumed from a moment at which the mobile terminal sends the 200 OK message to a moment at which the mobile terminal receives the ACK is approximately 700 ms. Therefore, considering a network quality problem or a problem of a poor signal environment, and a problem that the 200 OK message is likely to be retransmitted by the peer end, the preset duration may be set to duration longer than one RTT plus 700 ms, where one RTT is usually 2000 ms. For example, the preset duration may be set to 3000 ms. The preset duration may alternatively be set based on network quality and a signal environment. For example, in an environment with relatively good network signals or a relatively good signal environment, the preset duration may be set to relatively short duration. Contrarily, in an environment with relatively poor network signals or a relatively good signal environment, the preset duration may be set to relatively long duration.

509: Send the call hold request to the peer end.

According to the call hold method provided in this embodiment of the present invention, when the user has a call hold request, the mobile terminal first determines whether the procedure based on the call hold request of the peer end is completed at the peer end. If the procedure is completed, that is, an acknowledgement message based on the call hold request procedure of the peer end is received, it indicates that no signaling collision occurs, and sending a call hold request to the peer end at this time does not cause a call drop. In this case, the mobile terminal may send the call hold request to the peer end. If an acknowledgement message based on the call hold request procedure of the peer end is not received, the mobile terminal suspends sending the call hold request to the peer end, thereby preventing a call drop and improving user experience.

Figure 6:
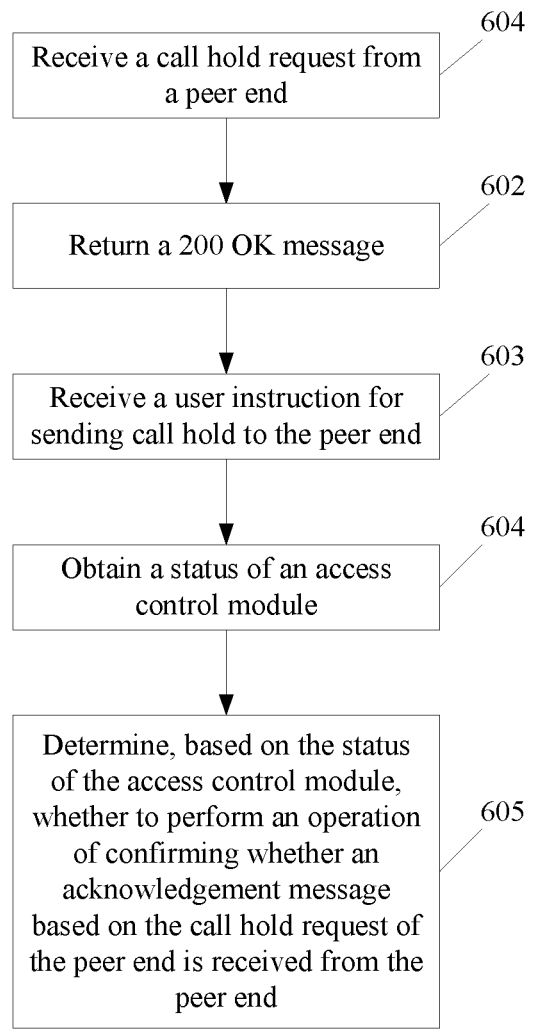
FIG. 6 is another method flowchart according to an embodiment of the present invention.

FIG. 6 shows a call hold method according to an embodiment of the present invention. Steps 601 to 603 are similar to steps 401 to 403 and steps 501 to 503 in the foregoing embodiments, and details are not described herein again.

604: Obtain a status of an access control module.

The access control module usually has three states: an initial state, a start state, and a completed state. The initial state indicates that a call is at a stage before ringing, the start state indicates that the call is at a ringing stage, and the completed state indicates that the call is connected.

605: Determine, based on the status of the access control module, whether to perform an operation of determining whether an acknowledgement message based on the call hold request of the peer end is received from the peer end.

Figure 7:
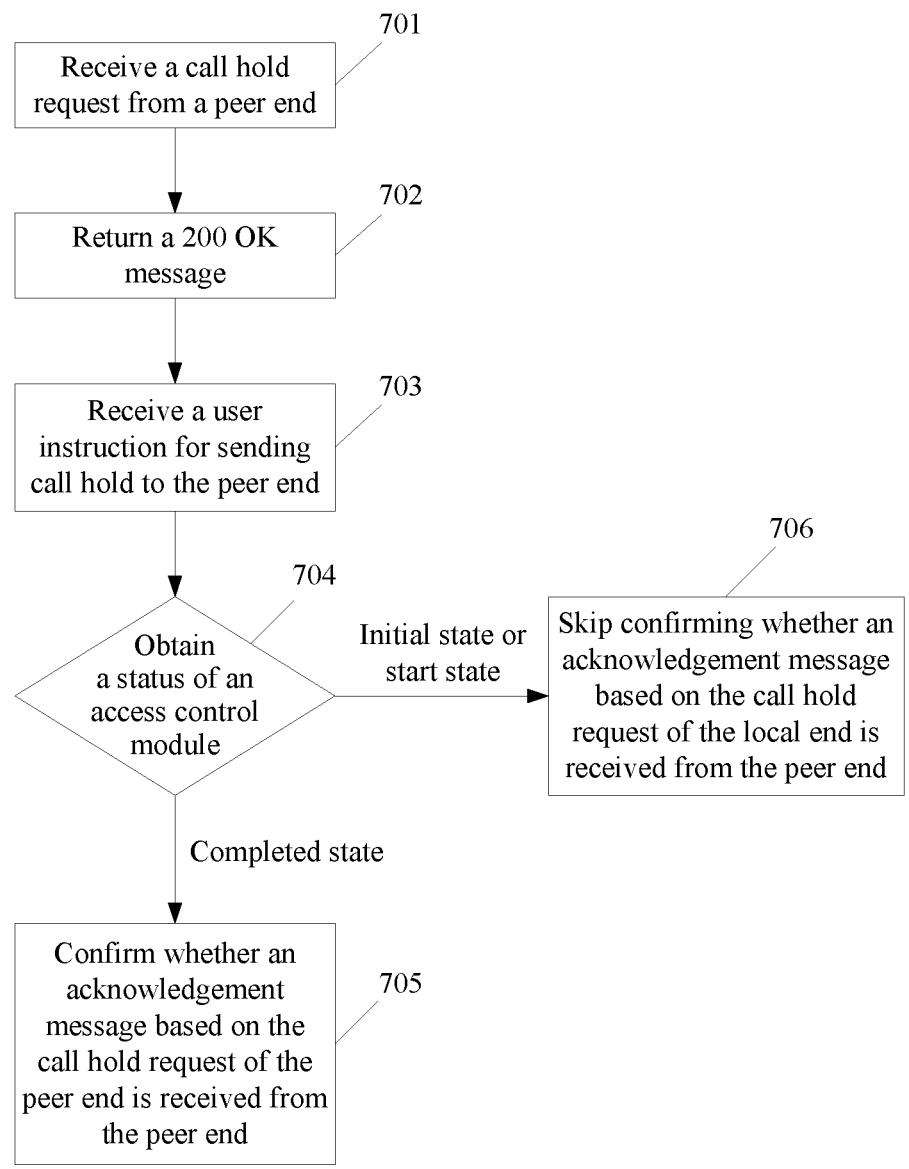
FIG. 7 is another method flowchart according to an embodiment of the present invention.

Generally, call hold occurs when a call is connected. Therefore, a mobile terminal may monitor the status of the access control module. As shown in FIG. 7, when the status of the access control module is the completed state, that is, when the call is in a connected state, the mobile terminal performs the operation of determining whether an acknowledgement message based on the call hold request of the peer end is received from the peer end. Certainly, a user may have a call hold request when the user has just finished dialing or during ringing. In other words, when the status of the access control module is the initial state or the start state, the mobile terminal also performs the operation of determining whether an acknowledgement message based on the call hold request of the peer end is received from the peer end. Specifically, when to perform the determining operation may be set by the user or a terminal vendor.

According to the call hold method provided in this embodiment of the present invention, when the user has a call hold request, the mobile terminal first determines the status of the access control module, and determines, based on the status of the access control module, whether to perform the operation of determining whether an acknowledgement message based on the call hold request of the peer end is received from the peer end, thereby expanding a scope of avoiding a call hold failure, and improving user experience.

Figure 8:
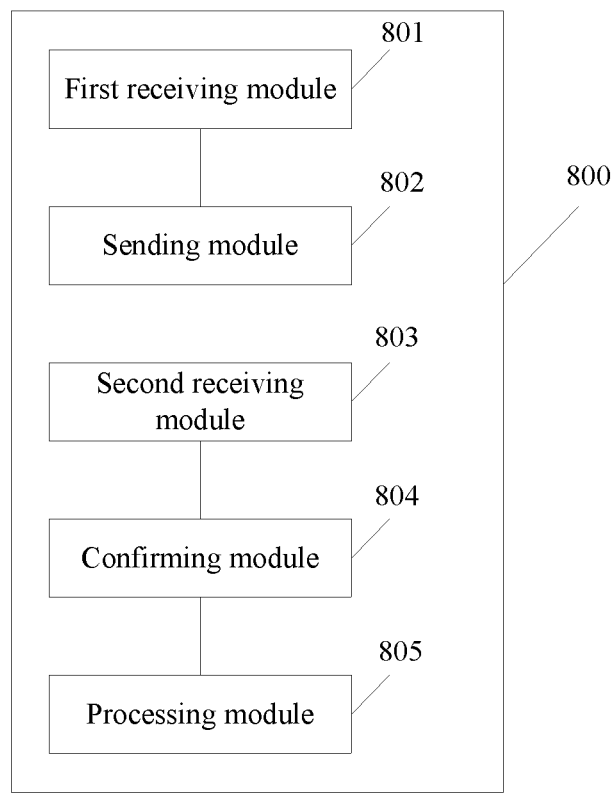
FIG. 8 is a schematic diagram of a mobile terminal according to an embodiment of the present invention.

FIG. 8 shows a mobile terminal 800 according to an embodiment of the present invention. The mobile terminal 800 includes a first receiving module 801, a sending module 802, a second receiving module 803, a determining module 804, and a processing module 805. The first receiving module 801 is configured to receive a call hold request sent from a peer end. The sending module 802 is configured to return a 200 OK message to the peer end. The second receiving module 803 is configured to receive a user instruction for sending a call hold request to the peer end. The determining module 804 is configured to determine whether an acknowledgement message based on the call hold request of the peer end is received from the peer end. The processing module 805 is configured to process, based on an acknowledgement message determining result, the user instruction for sending a call hold request to the peer end.

According to the mobile terminal provided in this embodiment of the present invention, when a user has a call hold request, the mobile terminal first determines whether a procedure based on the call hold request of the peer end is completed at the peer end, and then determines to process the call hold request of the user, thereby preventing a call drop and improving user experience.

Figure 9:
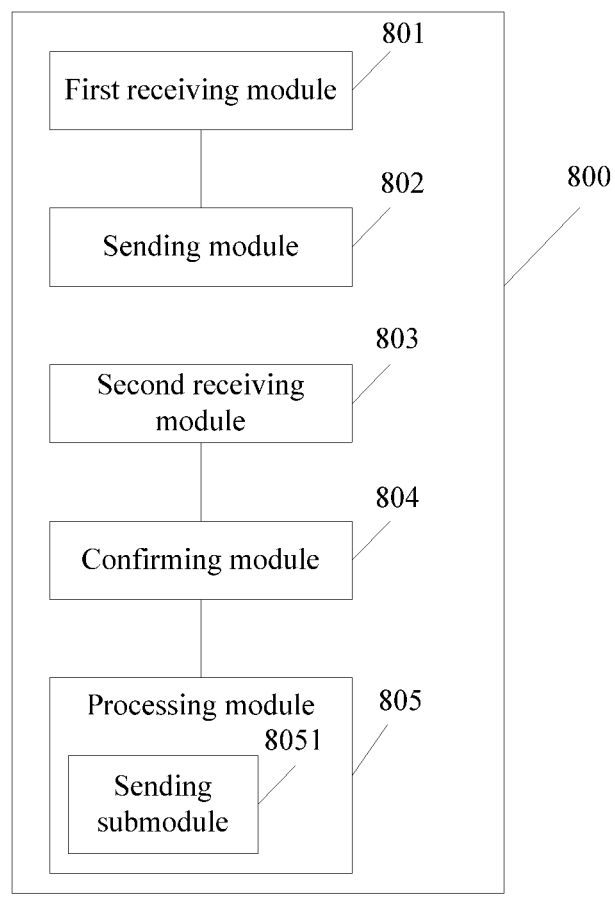
FIG. 9 is a schematic diagram of another mobile terminal according to an embodiment of the present invention.

FIG. 9 shows another mobile terminal 800 according to an embodiment of the present invention. Compared with the mobile terminal 800 in the embodiment shown in FIG. 8, in this embodiment, a processing module 805 of the mobile terminal 800 further includes a sending submodule 8051. When a determining module 804 determines that an acknowledgement message based on a call hold request of a peer end is received from the peer end, the sending submodule 8051 sends a call hold request to the peer end.

According to the mobile terminal provided in this embodiment of the present invention, when a user has a call hold request, the mobile terminal first determines whether a procedure based on the call hold request of the peer end is completed at the peer end. If the procedure is completed, that is, an acknowledgement message based on the call hold request procedure of the peer end is received, it indicates that no signaling collision occurs, and sending a call hold request to the peer end at this time does not cause a call drop. In this case, the mobile terminal may send the call hold request to the peer end. If an acknowledgement message based on the call hold request procedure of the peer end is not received, the mobile terminal suspends sending the call hold request to the peer end, thereby preventing a call drop and improving user experience.

Figure 10:
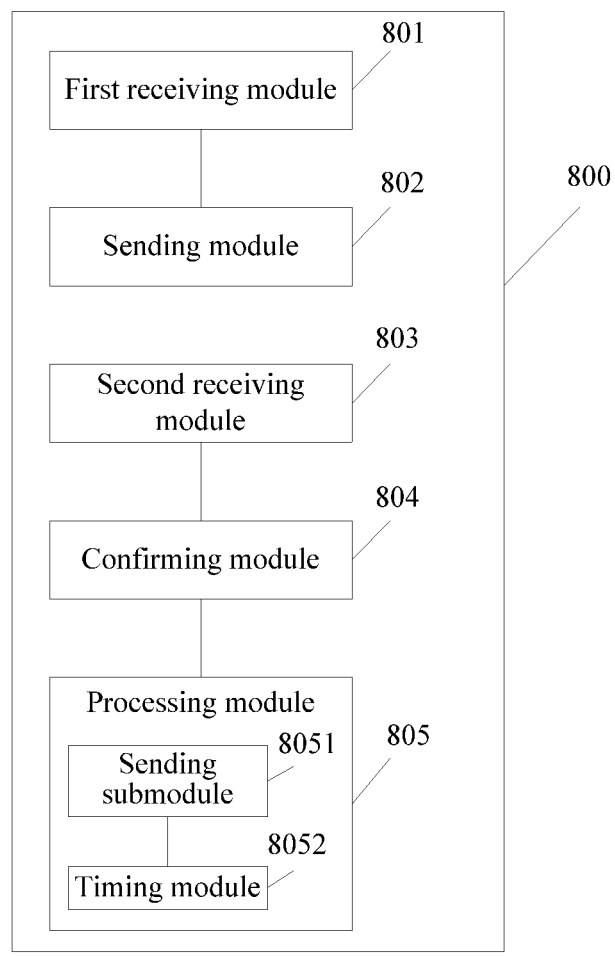
FIG. 10 is a schematic diagram of another mobile terminal according to an embodiment of the present invention.

FIG. 10 shows another mobile terminal 800 according to an embodiment of the present invention. Compared with the mobile terminal 800 in the embodiment shown in FIG. 8, in this embodiment, the processing module 805 of the mobile terminal 800 further includes a timing module 8052. If it is determined that an acknowledgement message based on a call hold request of a peer end is not received from the peer end, the processing module 805 places, in a to-be-processed queue, a call hold request to be sent to a peer end, and starts the timing module 8052 for timing; and if an acknowledgement message based on the call hold request of the peer end is received from the peer end within a preset time segment, the timing module 8052 stops timing, and the processing module 805 sends the call hold request that is to be sent to the peer end and that is in the to-be-processed queue; or if an acknowledgement message based on the call hold request of the peer end is not received from the peer end within a preset time, when a timing time segment of the timing module 8052 is greater than or equal to the preset time segment, the processing module 805 sends the call hold request that is to be sent to the peer end and that is in the to-be-processed queue.

Figure 11:
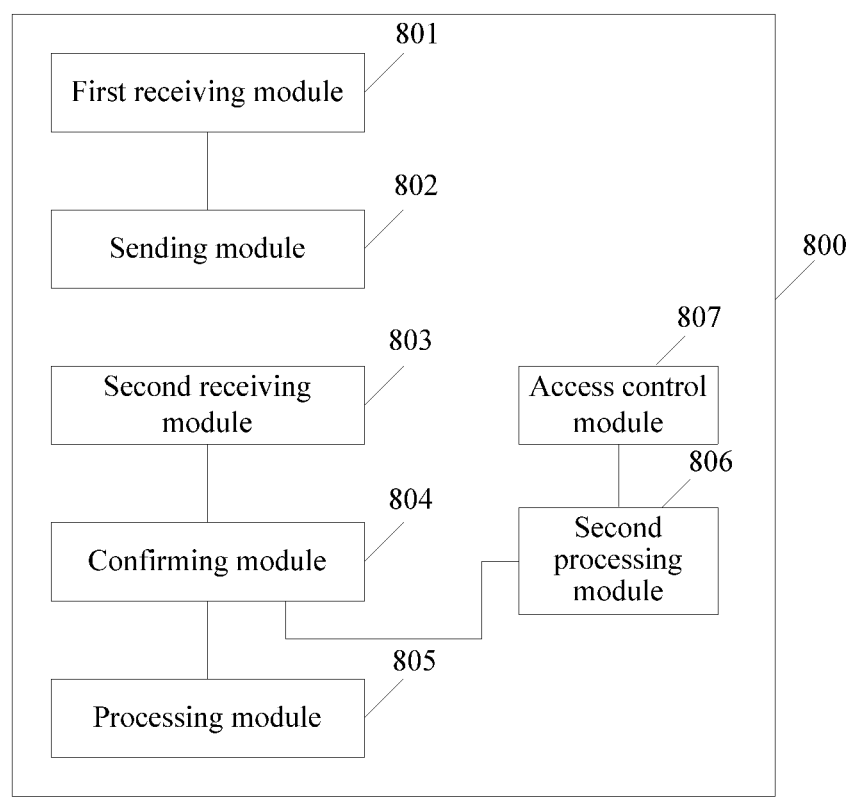
FIG. 11 is a schematic diagram of another mobile terminal according to an embodiment of the present invention.

FIG. 11 shows another mobile terminal 800 according to an embodiment of the present invention. Compared with the mobile terminal 800 in the embodiment shown in FIG. 8, in this embodiment, the mobile terminal 800 further includes a second processing module 806. The second processing module 806 is configured to obtain a status of an access control module and determine, based on the status of the access control module, whether to perform an operation of determining whether an acknowledgement message based on a call hold request of a peer end is received from the peer end.

Figure 12:
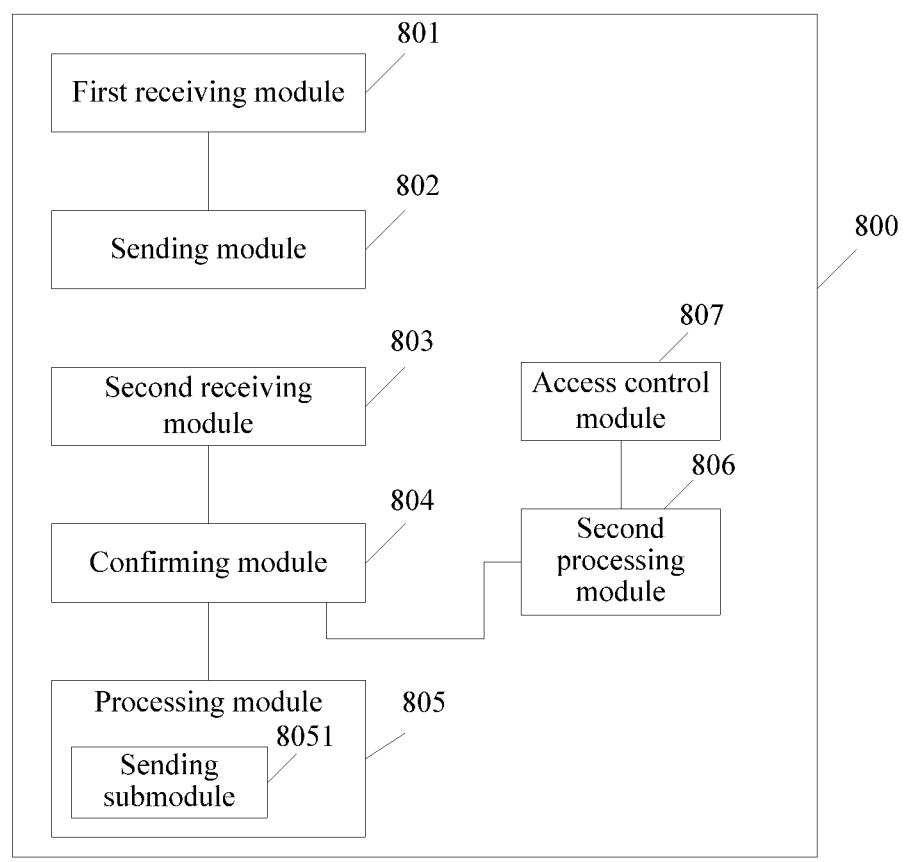
FIG. 12 is a schematic diagram of another mobile terminal according to an embodiment of the present invention.

FIG. 12 shows another mobile terminal 800 according to an embodiment of the present invention. Compared with the mobile terminal 800 in the embodiment shown in FIG. 9, in this embodiment, the mobile terminal 800 further includes a second processing module 806. The second processing module 806 is configured to obtain a status of an access control module and determine, based on the status of the access control module, whether to perform an operation of determining whether an acknowledgement message based on a call hold request of a peer end is received from the peer end.

Figure 13:
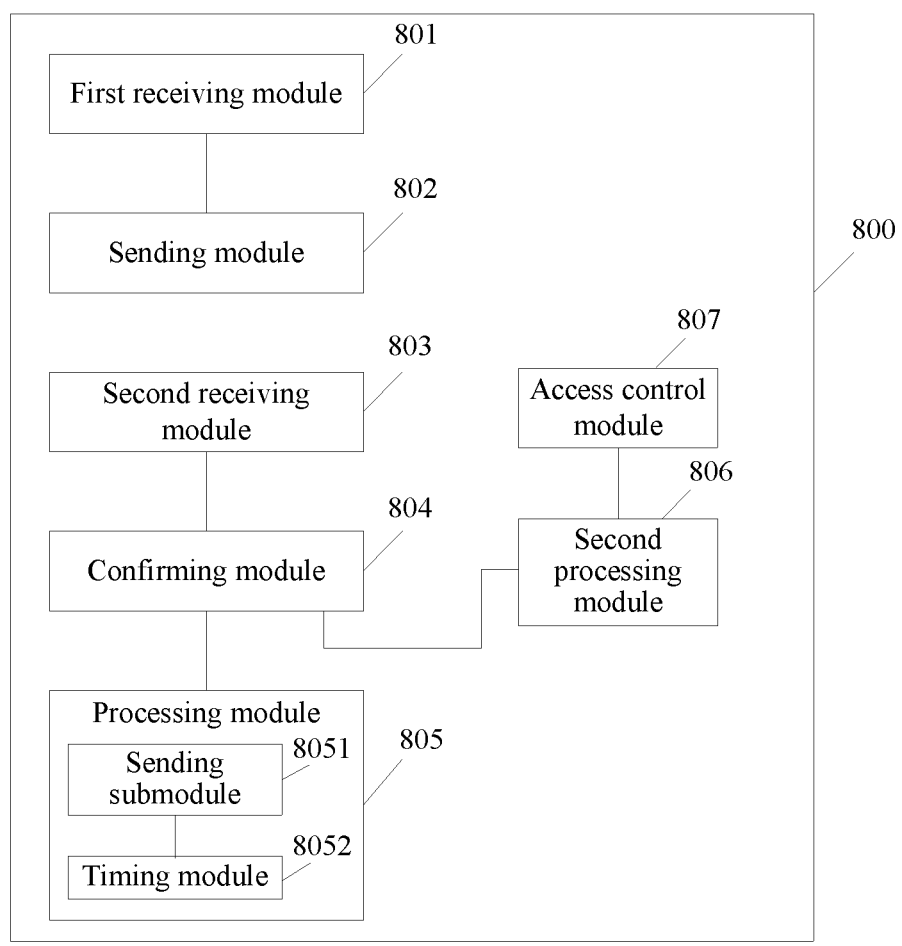
FIG. 13 is a schematic diagram of another mobile terminal according to an embodiment of the present invention.

FIG. 13 shows another mobile terminal 800 according to an embodiment of the present invention. Compared with the mobile terminal 800 in the embodiment shown in FIG. 10, in this embodiment, the mobile terminal 800 further includes a second processing module 806. The second processing module 806 is configured to obtain a status of an access control module and determine, based on the status of the access control module, whether to perform an operation of determining whether an acknowledgement message based on a call hold request of a peer end is received from the peer end.

According to the mobile terminals provided in the embodiments shown in FIG. 10 to FIG. 13, when the user has a call hold request, the mobile terminal first determines the status of the access control module, and determines, based on the status of the access control module, whether to perform the operation of determining whether an acknowledgement message based on the call hold request of the peer end is received from the peer end, thereby expanding a scope of avoiding a call hold failure, and improving user experience.

Figure 14:
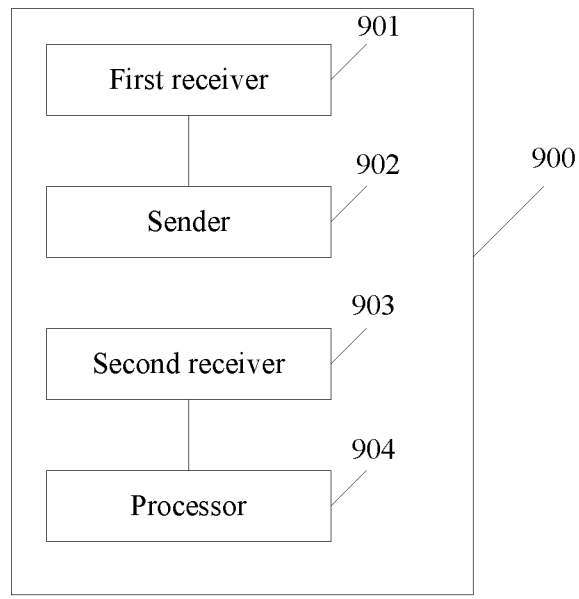
FIG. 14 is a schematic diagram of another mobile terminal according to an embodiment of the present invention.

FIG. 14 shows a mobile terminal 900 according to an embodiment of the present invention. The mobile terminal 900 includes a first receiver 901, a sender 902, a second receiver 903, and a processor 904. The first receiver 901 is configured to receive a call hold request from a peer end. The sender 902 is configured to return a 200 OK message to the peer end. The second receiver 903 is configured to receive a user instruction for sending a call hold request to the peer end. The processor 904 is configured to determine whether an acknowledgement message based on the call hold request of the peer end is received from the peer end, and process, based on an acknowledgement message determining result, the user instruction for sending a call hold request to the peer end.

According to the mobile terminal provided in this embodiment of the present invention, when a user has a call hold request, the mobile terminal first determines whether a procedure based on the call hold request of the peer end is completed at the peer end, and then determines to process the call hold request of the user, thereby preventing a call drop and improving user experience.

Figure 15:
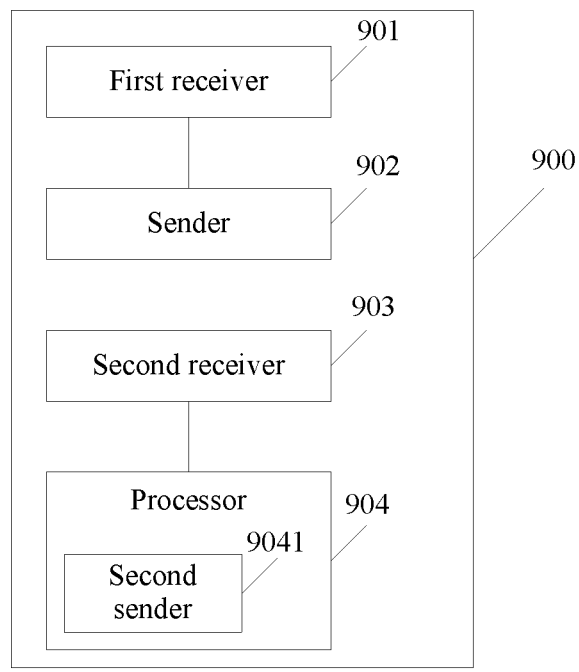
FIG. 15 is a schematic diagram of another mobile terminal according to an embodiment of the present invention.

FIG. 15 shows another mobile terminal 900 according to an embodiment of the present invention. Compared with the mobile terminal 900 shown in FIG. 14, in this embodiment, the processor of the mobile terminal 900 includes a second sender 9041. When the processor 904 determines that an acknowledgement message based on a call hold request of a peer end is received from the peer end, the second sender 9041 sends a call hold request to the peer end.

According to the mobile terminal provided in this embodiment of the present invention, when a user has a call hold request, the mobile terminal first determines whether a procedure based on the call hold request of the peer end is completed at the peer end. If the procedure is completed, that is, an acknowledgement message based on the call hold request procedure of the peer end is received, it indicates that no signaling collision occurs, and sending a call hold request to the peer end at this time does not cause a call drop. In this case, the mobile terminal may send the call hold request to the peer end. If an acknowledgement message based on the call hold request procedure of the peer end is not received, the mobile terminal suspends sending the call hold request to the peer end, thereby preventing a call drop and improving user experience.

Figure 16:
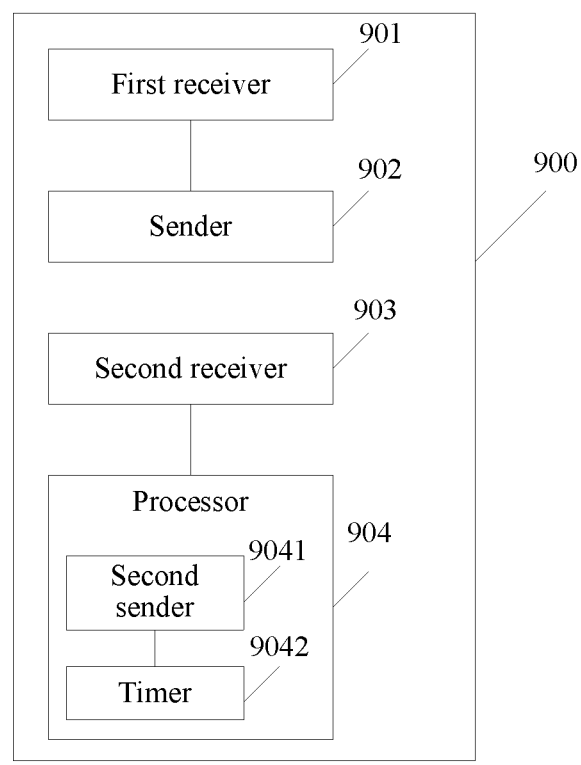
FIG. 16 is a schematic diagram of another mobile terminal according to an embodiment of the present invention.

FIG. 16 shows another mobile terminal 900 according to an embodiment of the present invention. Compared with the mobile terminal 900 shown in FIG. 14, in this embodiment, a processor of the mobile terminal 900 further includes a timer 9042. After determining that an acknowledgement message based on a call hold request of a peer end is not received from the peer end, the processor 904 places, in a to-be-processed queue, a call hold request to be sent to the peer end, and starts the timer 9042 for timing; and if an acknowledgement message based on the call hold request of the peer end is received from the peer end within a preset time segment, the timer 9042 stops timing, and the processor 904 sends the call hold request that is to be sent to the peer end and that is in the to-be-processed queue; or if an acknowledgement message based on the call hold request of the peer end is not received from the peer end within a preset time, when a timing time segment of the timer 9042 is greater than or equal to the preset time segment, the processor 904 sends the call hold request that is to be sent to the peer end and that is in the to-be-processed queue.

Figure 17:
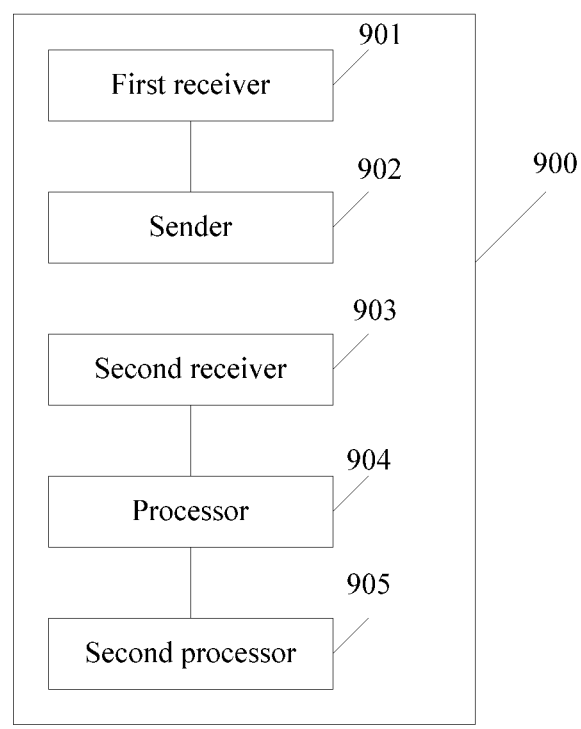
FIG. 17 is a schematic diagram of another mobile terminal according to an embodiment of the present invention.

FIG. 17 shows another mobile terminal 900 according to an embodiment of the present invention. Compared with the mobile terminal 900 shown in FIG. 14, in this embodiment, the mobile terminal 900 further includes a second processor 905. The second processor 905 is configured to obtain a status of an access control module and determine, based on the status of the access control module, whether to perform an operation of determining whether an acknowledgement message based on a call hold request of a peer end is received from the peer end.

Figure 18:
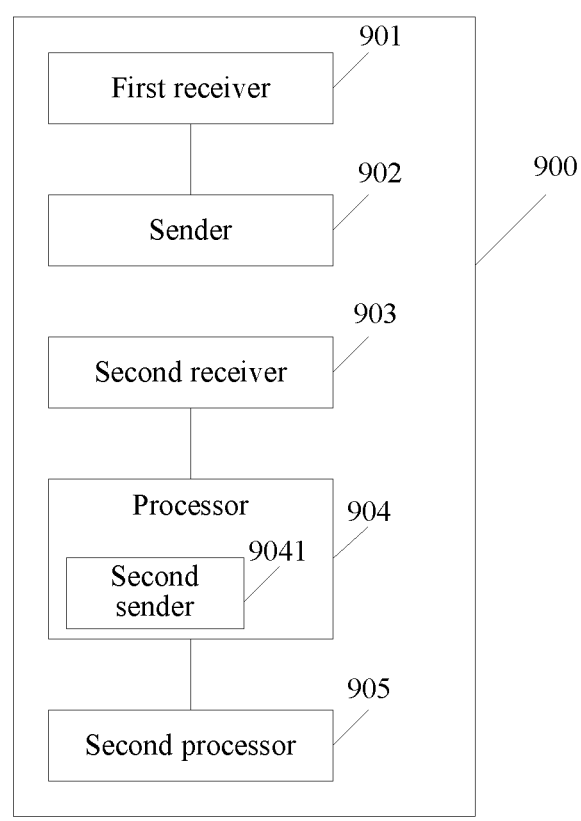
FIG. 18 is a schematic diagram of another mobile terminal according to an embodiment of the present invention.

FIG. 18 shows another mobile terminal 900 according to an embodiment of the present invention. Compared with the mobile terminal 900 shown in FIG. 15, in this embodiment, the mobile terminal 900 further includes a second processor 905. The second processor 905 is configured to obtain a status of an access control module and determine, based on the status of the access control module, whether to perform an operation of determining whether an acknowledgement message based on a call hold request of a peer end is received from the peer end.

Figure 19:
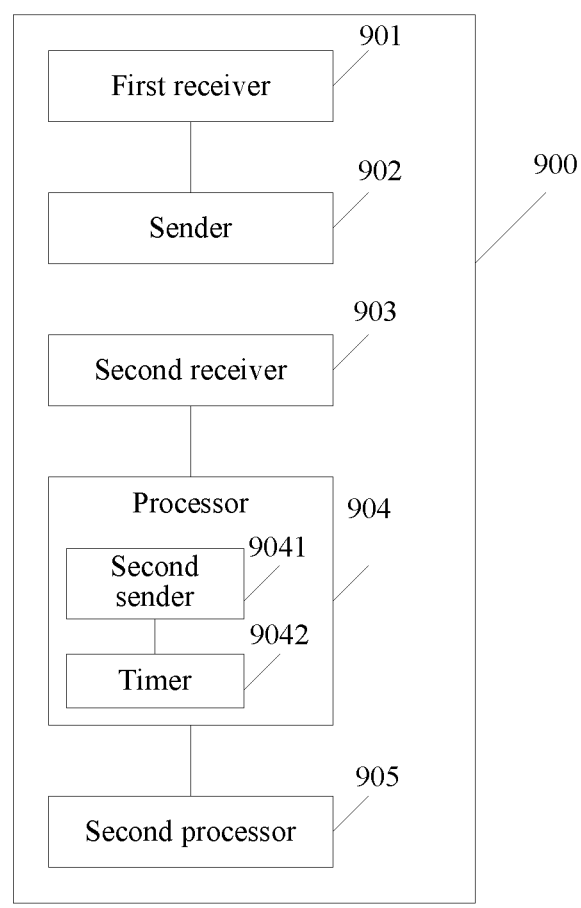
FIG. 19 is a schematic diagram of another mobile terminal according to an embodiment of the present invention.

FIG. 19 shows another mobile terminal 900 according to an embodiment of the present invention. Compared with the mobile terminal 900 shown in FIG. 16, in this embodiment, the mobile terminal 900 further includes a second processor 905. The second processor 905 is configured to obtain a status of an access control module and determine, based on the status of the access control module, whether to perform an operation of determining whether an acknowledgement message based on a call hold request of a peer end is received from the peer end.

According to the mobile terminals provided in the embodiments shown in FIG. 16 to FIG. 19, when the user has a call hold request, the mobile terminal first determines the status of the access control module, and determines, based on the status of the access control module, whether to perform the operation of determining whether an acknowledgement message based on the call hold request of the peer end is received from the peer end, thereby expanding a scope of avoiding a call hold failure, and improving user experience.

The present invention includes but is not limited to the foregoing embodiments. Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A call hold method for a mobile terminal, comprising:
receiving a first call hold request from a peer end;
returning an OK message in response to the peer end;
receiving a user instruction for sending a second call hold request to the peer end;
determining whether an acknowledgement message based on the first call hold request of the peer end is received from the peer end; and
processing, based on an acknowledgement message determining result, the user instruction for sending the second call hold request to the peer end by sending the second call hold request to the peer end after the acknowledgment message based on the first call hold request of the peer end is received from the peer end.

2. The call hold method of claim 1, wherein processing, based on the acknowledgement message determining result, the user instruction for sending the second call hold request to the peer end comprises:
placing the second call hold request to be sent to the peer end in a to-be-processed queue and starting timing after the acknowledgement message based on the first call hold request of the peer end is not received from the peer end; and
stopping the timing and sending the second call hold request that is to be sent to the peer end and that is in the to-be-processed queue when the acknowledgement message based on the first call hold request of the peer end is received from the peer end within a preset time segment.

3. The call hold method of claim 1, further comprising:
obtaining a status of an access control circuit; and
determining, based on the status of the access control circuit, whether the acknowledgement message based on the first call hold request of the peer end is received from the peer end.

4. The call hold method of claim 3, wherein obtaining the status of the access control circuit and determining, based on the status of the access control circuit, whether the acknowledgement message based on the first call hold request of the peer end is received from the peer end comprises determining whether the acknowledgement message based on the first call hold request of the peer end is received from the peer end when the status of the access control circuit is an end state.

5. A mobile terminal, comprising:
a memory comprising instructions; and
a computer processor coupled to the memory and configured to execute the instructions to configure the mobile terminal to:
receive a first call hold request sent from a peer end;
return an OK message to the peer end;
receive a user instruction for sending a second call hold request to the peer end;
determine whether an acknowledgement message based on the first call hold request of the peer end is received from the peer end; and
process, based on an acknowledgement message determining result, the user instruction for sending the second call hold request to the peer end by sending the second call hold request to the peer end after the acknowledgement message based on the first call hold request of the peer end is received from the peer end.

6. The mobile terminal of claim 5, wherein the computer processor is configured to execute the instructions to configure the mobile terminal to process, based on the acknowledgement message determining result, the user instruction for sending the second call hold request to the peer end by:
placing, in a to-be-processed queue, the second call hold request to be sent to the peer end and starting a timer for timing when the acknowledgement message based on the first call hold request of the peer end is not received from the peer end;
stop timing and sending the second call hold request that is to be sent to the peer end and that is in the to-be-processed queue when the acknowledgement message based on the first call hold request of the peer end is received from the peer end within a preset time segment; and
sending the second call hold request that is to be sent to the peer end and that is in the to-be-processed queue when the acknowledgement message based on the first call hold request of the peer end is not received from the peer end within a preset time and when a timing time segment is greater than or equal to the preset time segment.

7. The mobile terminal of claim 5, wherein the computer processor is further configured to execute the instructions to configure the mobile terminal to:
obtain a status of an access control circuit; and
determine, based on the status of the access control circuit, whether the acknowledgement message based on the first call hold request of the peer end is received from the peer end.

8. The mobile terminal of claim 7, wherein the computer processor is further configured to execute the instructions to configure the mobile terminal to obtain the status of the access control circuit and determine, based on the status of the access control circuit, whether the acknowledgement message based on the first call hold request of the peer end is received from the peer end comprises:
determining whether the acknowledgement message based on the first call hold request of the peer end is received from the peer end when the status of the access control circuit is an end state; and
skip determining whether the acknowledgement message based on the first call hold request of the peer end is received from the peer end when the status of the access control circuit is an initial state or a start state.

9. A mobile terminal, comprising:
a receiver configured to receive a first call hold request sent from a peer end;
a transmitter configured to return an OK message to the peer end;
a second receiver configured to receive a user instruction for sending the second call hold request to the peer end; and a processor configured to:
  determine whether an acknowledgement message based on the first call hold request of the peer end is received from the peer end; and
  process, based on an acknowledgement message determining result, the user instruction for sending the second call hold request to the peer end by sending the second call hold request to the peer end with a second transmitter after the acknowledgement message based on the first call hold request of the peer end is received from the peer end.

10. The mobile terminal of claim 9, further comprising a timer, and wherein the processor processes, based on the acknowledgement message determining result, the user instruction for sending the second call hold request to the peer end comprises:
  placing, in a to-be-processed queue, the second call hold request to be sent to the peer end and starting the timer for timing after the acknowledgement message based on the first call hold request of the peer end is not received from the peer end;
  stopping the timing and sending the second call hold request that is to be sent to the peer end and that is in the to-be-processed queue when the acknowledgement message based on the first call hold request of the peer end is received from the peer end within a preset time segment; and
  sending the second call hold request that is to be sent to the peer end and that is in the to-be-processed queue when the acknowledgement message based on the first call hold request of the peer end is not received from the peer end within a preset time and when a timing time segment of the timer is greater than or equal to the preset time segment.

11. The mobile terminal of claim 9, further comprising a second processor, wherein the second processor is configured to:
  obtain a status of an access control circuit; and
  determine, based on the status of the access control circuit, whether the acknowledgement message based on the ft call hold request of the peer end is received from the peer end.

12. The mobile terminal of claim 11, wherein the second processor obtains the status of the access control circuit and determines, based on the status of the access control circuit, whether the acknowledgement message based on the first call hold request of the peer end is received from the peer end comprises:
  determining whether the acknowledgement message based on the first call hold request of the peer end is received from the peer end when the status of the access control circuit is an end state; and
  determining whether the acknowledgement message based on the first call hold request of the peer end is received from the peer end when the status of the access control circuit is an initial state or a start state.

13. The call hold method of claim 1, wherein the OK message is a 200 OK message.

14. The call hold method of claim 1, wherein processing, based on the acknowledgement message determining result, the user instruction for sending the second call hold request to the peer end comprises:
  placing the second call hold request to be sent to the peer end in a to-be-processed queue and starting timing after the acknowledgement message based on the first call hold request of the peer end is not received from the peer end; and
  sending the second call hold request that is to be sent to the peer end and that is in the to-be-processed queue when the acknowledgement message based on the first call hold request of the peer end not being received from the peer end within a preset time and when a timing time segment is greater than or equal to a preset time segment.

15. The call hold method of claim 3, wherein obtaining the status of the access control circuit and determining, based on the status of the access control circuit, whether the acknowledgement message based on the first call hold request of the peer end is received from the peer end comprises skip determining whether the acknowledgement message based on the first call hold request of the peer end is received from the peer end when the status of the access control circuit is an initial state or a start state.

16. The mobile terminal of claim 5, wherein the OK message is a 200 OK message.

17. The mobile terminal of claim 9, wherein the OK message is a 200 OK message.

18. The call hold method of claim 1, wherein before receiving the first call hold request from the peer end, the mobile terminal establishes a Voice over Long-Term Evolution (VoLTE) communication connection with the peer end.

19. The call hold method of claim 1, wherein before receiving the first call hold request from the peer end, the mobile terminal establishes a Voice over WI-FI (VoWI-FI) communication connection with the peer end.

20. The call hold method of claim 1, wherein after processing, based on the acknowledgement message determining result, the user instruction for sending the second call hold request to the peer end, the mobile terminal performs a hold on a communication connection with the peer end.

* * * * *

UNITED STATES PATENT AND TRADEMARK OFFICE
CERTIFICATE OF CORRECTION

PATENT NO. : 10,652,389 B2
APPLICATION NO. : 16/474796
DATED : May 12, 2020
INVENTOR(S) : Zhenzhong Zhang and Yuwei Fan It is certified that error appears in the above-identified patent and that said Letters Patent is hereby corrected as shown below:

In the Claims

Claim 11, Column 15, Line 41: "the ft call hold request" should read "the first call hold request"

Signed and Sealed this
Twenty-third Day of June, 2020

Andrei Iancu
*Director of the United States Patent and Trademark Office*